(12) United States Patent
Sato

(10) Patent No.: US 10,345,779 B2
(45) Date of Patent: Jul. 9, 2019

(54) THREE-DIMENSIONAL FORMING DATA MANAGEMENT SYSTEM AND METHOD

(71) Applicant: CANON KABUSHIKI KAISHA, Tokyo (JP)

(72) Inventor: Junji Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 15/466,242

(22) Filed: Mar. 22, 2017

(65) Prior Publication Data

US 2017/0285601 A1 Oct. 5, 2017

(30) Foreign Application Priority Data

Mar. 30, 2016 (JP) ................................ 2016-069177

(51) Int. Cl.
| | |
|---|---|
| *H04L 9/32* | (2006.01) |
| *B33Y 50/00* | (2015.01) |
| *G06F 21/44* | (2013.01) |
| *G06F 21/60* | (2013.01) |
| *B29C 64/386* | (2017.01) |
| *G05B 19/042* | (2006.01) |

(52) U.S. Cl.
CPC ........ *G05B 19/0426* (2013.01); *B29C 64/386* (2017.08); *B33Y 50/00* (2014.12); *G06F 21/44* (2013.01); *G06F 21/608* (2013.01); *H04L 9/3226* (2013.01); *G06F 2221/2137* (2013.01); *Y02P 90/265* (2015.11)

(58) Field of Classification Search
None
See application file for complete search history.

(56) References Cited

U.S. PATENT DOCUMENTS

| | | | | |
|---|---|---|---|---|
| 2005/0180564 | A1* | 8/2005 | Asano | G06F 21/608 380/28 |
| 2005/0289346 | A1* | 12/2005 | Minagawa | G06F 21/608 713/171 |
| 2007/0035763 | A1* | 2/2007 | Bard | G06F 3/1222 358/1.15 |
| 2011/0001995 | A1* | 1/2011 | Sato | G06F 21/608 358/1.11 |
| 2014/0156053 | A1* | 6/2014 | Mahdavi | G06Q 50/04 700/119 |

FOREIGN PATENT DOCUMENTS

JP 2015-174272 A 10/2015

* cited by examiner

*Primary Examiner* — Ryan A Jarrett
(74) *Attorney, Agent, or Firm* — Canon U.S.A., Inc. IP Division

(57) ABSTRACT

A management system that manages forming data to be used in forming of a three-dimensional object. The management system encrypts the forming data such that a forming control apparatus, which controls a forming apparatus managed by the management system, performs decryption processing. The management system notifies a request source of a forming request of the forming data of a forming code to be generated for forming processing to be performed based on the forming data in response to an approval by a user associated with target forming data of the forming request. The notified forming code is used to acquire the encrypted forming data or control the forming processing.

14 Claims, 23 Drawing Sheets

FIG. 5

| PRINTER ID | PRINTER NAME | REGISTRANT | REGISTRATION DATE | EXPIRATION DATE | MAKER | MODEL |
|---|---|---|---|---|---|---|
| P0001 | X3D-1000 (FORMING ROOM B) | A HOSPITAL | 2015/9/7 | 2016/8/31 | X CORPORATION | X3D-1000 |
| P0002 | 3F SOUTH_YY5050 | B RESEARCH CENTER | 2015/12/14 | 2016/8/31 | Y CORPORATION | YY-5050 |
| ... | | ... | ... | ... | ... | ... |

FIG. 6A

| PRINTER ADMINISTRATOR ID | PASSWORD | REGISTRATION DATE | PRINTER ID |
|---|---|---|---|
| A001 | xxxxxxx | 2015/9/7 | P0001 |
| A002 | xxxxxxx | 2015/9/15 | P0001 |
| ... | ... | ... | ... |

FIG. 6B

| USER ID | PASSWORD | REGISTRATION DATE |
|---|---|---|
| U00001 | xxxxxxx | 2015/8/2 |
| U00002 | xxxxxxx | 2015/8/3 |
| ... | ... | ... |

FIG. 7

| FORMING DATA ID | FORMING DATA NAME | USER ID | REGISTRATION DATE | FORMING DATA | PRINTER ID |
|---|---|---|---|---|---|
| M0000001 | 30161_MAXILLARY CANINE TOOTH 11 | U00001 | 2015/8/2 | ... | |
| M0000002 | MANDIBLE BONE 14 | U00001 | 2015/9/19 | ... | P0001 |
| ... | ... | ... | ... | ... | ... |

FIG. 8

```
FORMING DATA REGISTRATION

USER AUTHENTICATION INFORMATION                801

USER ID:  [U00001]

PASSWORD: [●●●●●]

FORMING DATA                                   802

FORMING DATA NAME: [30161_MAXILLARY CANINE TOOTH 11]    803
    FORMING DATA: [c:¥3DModel¥30161_MAXILLARY CANINE TOOTH 11.stl]  [REFERENCE]
ENCRYPTION PASSWORD: [●●●●●]

804
                            [REGISTRATION] [CANCELLATION]
```

FIG. 10

FORMING PERMISSION REQUEST

FORMING DATA                                           1001

FORMING DATA ID: [M0000001        ]

PRINTER INFORMATION                                    1002

PRINTER: [X3D-1000(FORMING ROOM B) ▽]

1003
                             [TRANSMISSION] [CANCELLATION]

FIG. 11

FORMING PERMISSION CONFIRMATION

FORMING DATA                                    1101

FORMING DATA ID: M0000001
  FORMING DATA NAME: 30161_MAXILLARY CANINE TOOTH 11

PRINTER INFORMATION                             1102

PRINTER ID: P0001
    PRINTER NAME: X3D-1000(FORMING ROOM B)
    REGISTRANT: A HOSPITAL

ABOVE FORMING IS REQUESTED.                 1103
    IF PERMISSIBLE,
    THEN ENTER USER AUTHENTICATION INFORMATION.
         USER ID: [U00001]
         PASSWORD: [●●●●●]
                                    1104
                         [TRANSMISSION]  [CANCELLATION]

FIG. 12

FORMING PERMISSION COMPLETION

FORMING IS PERMISSIBLE AS FOLLOWS.
START FORING WITH FORMING CODE.

FORMING PERMISSION INFORMATION          1201

FORMING CODE: AE8C2D
    FORMING PERMISSION DATE: 2016/3/24
    EXPIRATION DATE: 2016/3/25
    NUMBER OF TIMES FORMING IS FEASIBLE: 1

FORMING INFORMATION                     1202

FORMING DATA ID: M0000001
FORMING DATA NAME: 30161_MAXILLARY CANINE TOOTH 11
PRINTER ID: P0001
PRINTER NAME: X3D-1000(FORMING ROOM B)
REGISTRANT: A HOSPITAL

| FORMING CODE | FORMING PERMISSION DATE | EXPIRATION DATE | PRINTER ID | FORMING DATA ID | STATUS | ABANDONMENT STATUS |
|---|---|---|---|---|---|---|
| FG14B3 | 2016/2/12 | 2016/2/13 | P0001 | M0000002 | FORMING FAILURE (7BC55A IS AUTOMATICALLY ISSUED) | DISCARDED |
| 7BC55A | 2016/2/12 | 2016/2/13 | P0001 | M0000002 | FORMING SUCCESS | |
| AE802D | 2016/3/24 | 2016/3/25 | P0001 | M0000001 | UNEXECUTED | |
| ... | | | | | ... | ... |

FIG. 15A

```
FORMING CODE ENTRY

ENTER FORMING CODE.           1501
  ┌─────────────────────────────┐
  │ AE8C2D                      │
  └─────────────────────────────┘

1502
                        ( OK )   ( CANCELLATION )
```

FIG. 15B

```
FORMING DATA CONFIRMATION

IS IT ALRIGHT IF FOLLOWING FORMING IS PERFORMED?

FORMING DATA ID: M0000001
   FORMING DATA NAME: 30161_MAXILLARY CANINE TOOTH 11

1503 ─( EXECUTION )
```

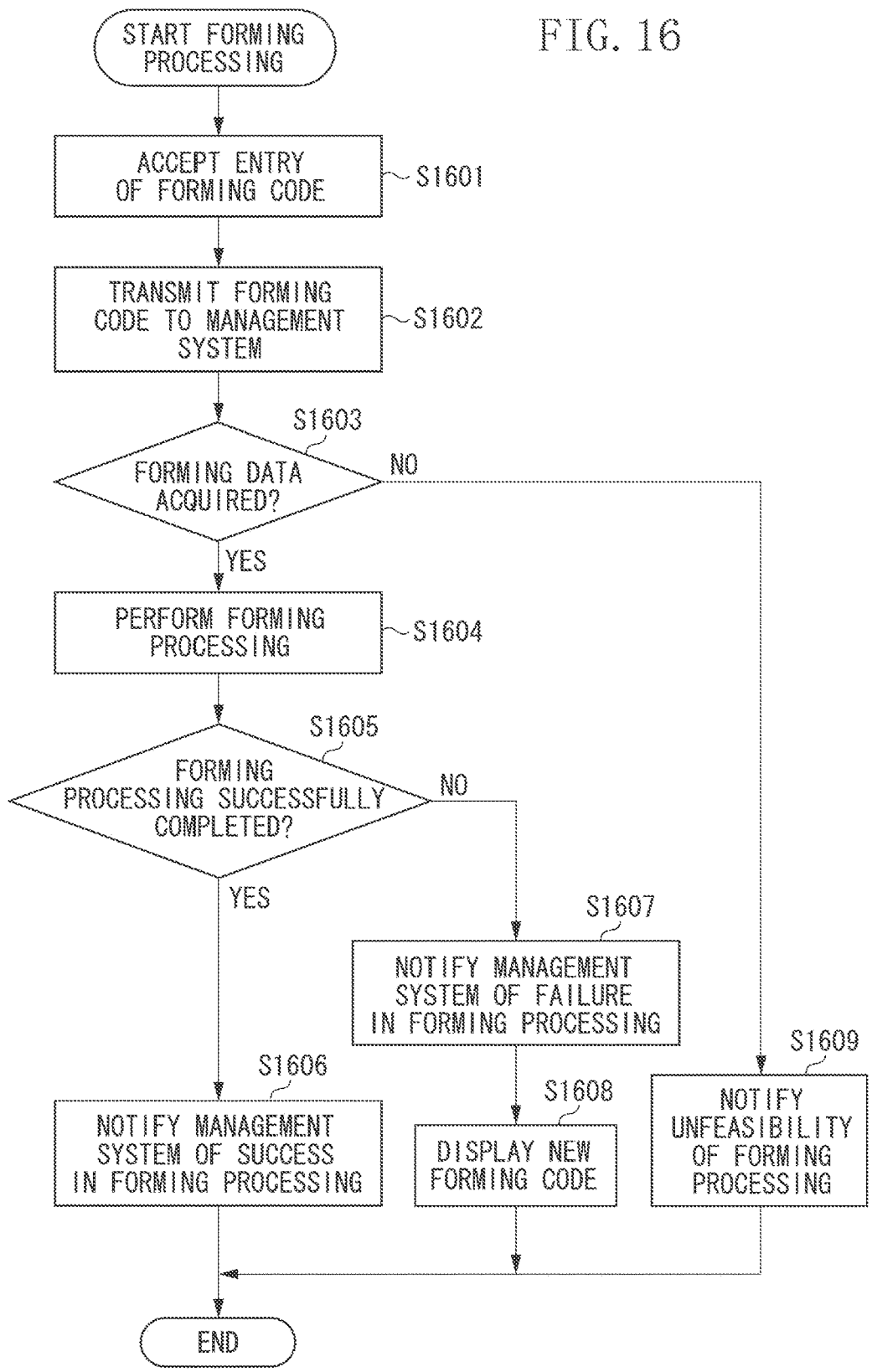

FIG. 20

```
FORMING PERMISSION COMPLETION

FORMING IS PERMISSIBLE AS FOLLOWS.
  START FORMING WITH DOWNLOADED FORMING CODE.

FORMING PERMISSION INFORMATION          1201

FORMING CODE: AE8C2D
      FORMING PERMISSION DATE: 2016/3/24
      EXPIRATION DATE: 2016/3/25
      NUMBER OF TIMES FORMING IS FEASIBLE: 1

FORMING INFORMATION                     1202

FORMING DATA ID: M0000001
    FORMING DATA NAME: 30161_MAXILLARY CANINE TOOTH 11
    PRINTER ID: P0001
    PRINTER NAME: X3D-1000(FORMING ROOM B)
    REGISTRANT: A HOSPITAL

2001─[ DOWNLOAD ]
```

THREE-DIMENSIONAL FORMING DATA MANAGEMENT SYSTEM AND METHOD

BACKGROUND OF THE INVENTION

Field of the Invention

The aspect of the embodiments relates to a technique for controlling forming of a three-dimensional object.

Description of the Related Art

In recent years, the usage of a three-dimensional (3D) printer, i.e., a forming apparatus that can form a three-dimensional object, is spreading rapidly. Various three-dimensional object forming methods are practically employable. For example, a fused deposition modeling (FDM) type 3D printer is inexpensive and can be easily operated by general consumers. Further, the 3D printer related technique is applied to various fields.

For example, the research for utilizing the 3D printer continues in the medical field. More specifically, the 3D printer can form a 3D model of a patient's organ with X rays or CT images. Further, the 3D printer can form a bone or an organ to be transplanted into a human body, by using a biocompatible material. In a field other than the medical field, the 3D printer can be utilized to perform forming processing relating to individual privacy or to perform forming processing relating to a company secret.

On the other hand, there is a conventional technique for individually managing an object formed by the 3D printer. For example, as discussed in Japanese Patent Application Laid-Open No. 2015-174272, the object individual management can be realized by embedding a RFID tag into an object whose forming is in progress.

The above-mentioned forming data including model data for a 3D object should be strictly managed if the data is personal information or confidential information. It may be necessary to prevent the forming (or utilization) of the personal or confidential information from being unnecessarily performed without approval of a proper approver (or authorizer). However, the technique discussed in Japanese Patent Application Laid-Open No. 2015-174272 is ineffective to protect the model data itself to be used in forming processing, because it intends to individually manage a formed object. There is a situation that unauthorized forming processing may be performed.

From the view point of data management, it may be necessary to manage a historical record that describes how the forming data has been utilized. Further, additional management for restricting usable forming apparatuses may become necessary.

SUMMARY OF THE INVENTION

According to an aspect of the embodiments, a system includes a management system that manages forming data to be used in forming of a three-dimensional object and a forming control apparatus that controls a forming unit configured to form the three-dimensional object. The management system includes a first management unit configured to manage identification information about a forming apparatus that forms the three-dimensional object, an encryption unit configured to encrypt the forming data such that the forming data can be decrypted by the forming control apparatus that controls the forming unit of the forming apparatus, a second management unit configured to manage identification information about the forming data and identification information about a user who approves utilization of the forming data while associating them with each other, a reception unit configured to receive a forming request of the forming data, a generation unit configured to generate a forming code for forming processing to be performed based on the forming data, in response to an approval by a user identified by the user information managed in association with the identification information about target forming data of the forming request by the second management unit, and a notification unit configured to notify a request source of the received forming request of the forming code. The forming control apparatus includes a decryption unit configured to perform decryption processing on the encrypted forming data acquired by using the forming code from the management system, and a control unit configured to control the forming unit to perform forming processing of a three-dimensional object based on the forming data subjected to the decryption processing.

Further features of the disclosure will become apparent from the following description of exemplary embodiments with reference to the attached drawings.

BRIEF DESCRIPTION OF THE DRAWINGS

FIG. 5 illustrates an example of printer information that can be managed by the management system.

FIGS. 6A and 6B illustrate examples of user information that can be managed by the management system.

FIG. 7 illustrates an example of forming data that can be managed by the management system.

FIG. 8 illustrates an example of a forming data registration screen that can be provided by the management system.

FIG. 10 illustrates an example of a forming permission request setting screen that can be provided by the management system.

FIG. 11 illustrates an example of a forming permission confirmation screen that can be provided by the management system.

FIG. 12 illustrates an example of a forming permission completion screen that can be provided by the management system.

FIG. 14 illustrates an example of forming permission information that can be managed by a permission information management unit.

FIGS. 15A and 15B illustrate exemplary forming implementation instruction screens that can be provided by the 3D printer.

FIG. 16 is a flowchart illustrating forming processing that can be performed by the 3D printer.

FIG. 20 illustrates an example of a forming permission completion screen that can be provided by the management system according to a second exemplary embodiment.

DESCRIPTION OF THE EMBODIMENTS

Hereinafter, a first exemplary embodiment of the disclosure will be described in detail below with reference to attached drawings.

Figure 1:
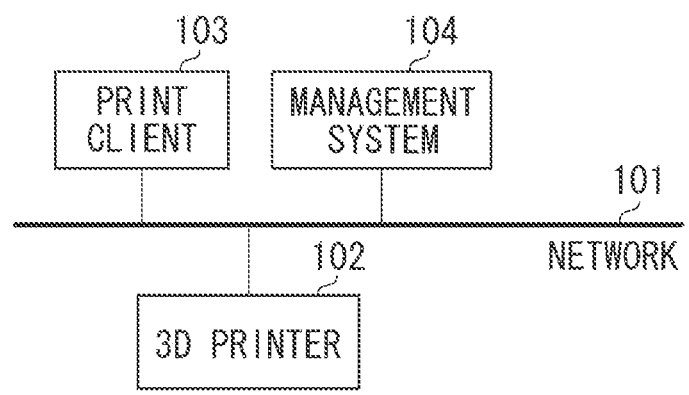
FIG. 1 is a block diagram illustrating an exemplary configuration of a network system according to an aspect of the embodiments.

FIG. 1 is a block diagram illustrating an exemplary configuration of a network system according to an aspect of the embodiments. A network 101 is a wide area network (WAN), such as Internet. A three-dimensional (3D) printer 102 is a forming apparatus that can form a three-dimensional object. A client apparatus 103 is, for example, a personal computer, a tablet computer, or a smartphone. A management system 104 is a system that includes at least one server computer that can manage the 3D printer, user information, and forming data. The 3D printer 102, the client apparatus 103, and the management system 104 can mutually transmit and receive information and data via the network 101. The network 101 can be configured as a wireless LAN or any other wireless network or can be configured as a local area network (LAN). Further, the network system can be configured to include at least one another 3D printer that can be managed by the management system 104.

Figure 2:
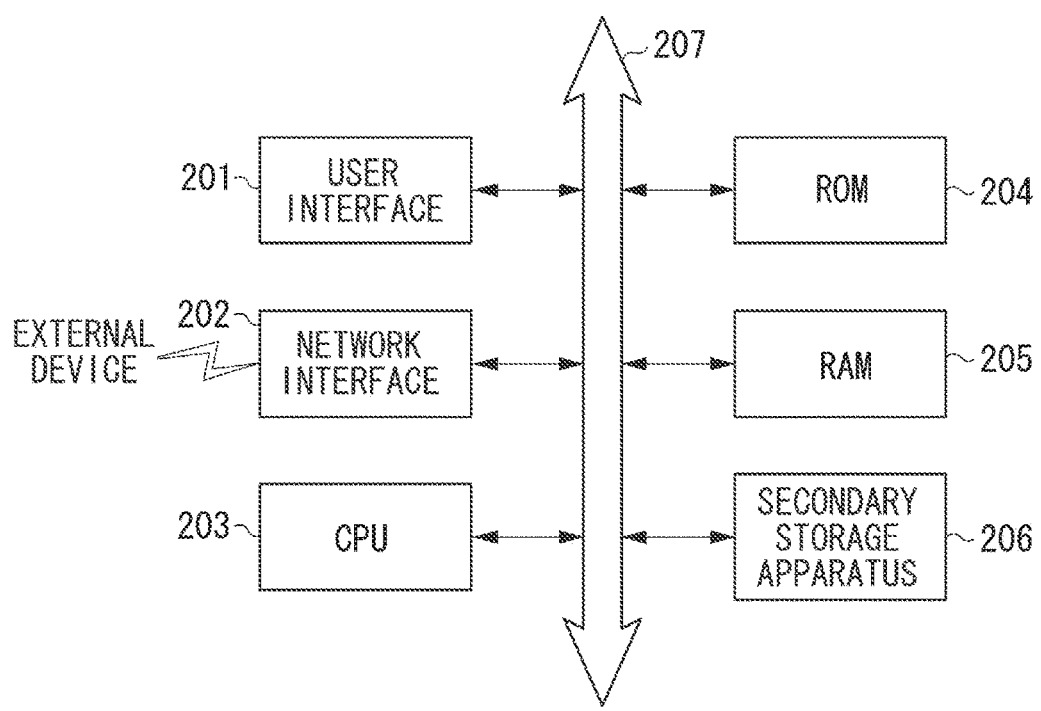
FIG. 2 illustrates an exemplary hardware configuration of an information processing apparatus according to an aspect of the embodiments.

FIG. 2 illustrates an exemplary hardware configuration of an information processing apparatus, such as a built-in computer of the 3D printer 102, the client apparatus 103, or the server computer that constitutes the management system 104.

A user interface 201 includes a display device, a keyboard, a mouse, a touch panel, and buttons, which enables a user to input and output information and signals. If a computer does not include the above-mentioned hardware configuration, it is feasible to perform connection and operation from other computer by using a remote desktop or a remote shell. A network interface 202, when it is connected to a network (e.g., LAN), can communicate with another computer or another network device. If necessary, the information processing apparatus can include another interface that uses an external memory, such as a universal serial bus (USB). A central processing unit (CPU) 203 can execute a program when it is loaded from a read only memory (ROM) 204, a random access memory (RAM) 205, or a secondary storage apparatus 206. The ROM 204 can store installed programs and various data. The RAM 205 is a temporary memory region. The secondary storage apparatus 206 is, for example, a hard disk drive (HDD) or a flash memory. The above-mentioned hardware devices are connected to each other via an input/output interface 207. Programs necessary to realize various kinds of processing according to an aspect of the embodiments are stored in the secondary storage apparatus 206 and can be executed by the CPU 203.

Figure 3:
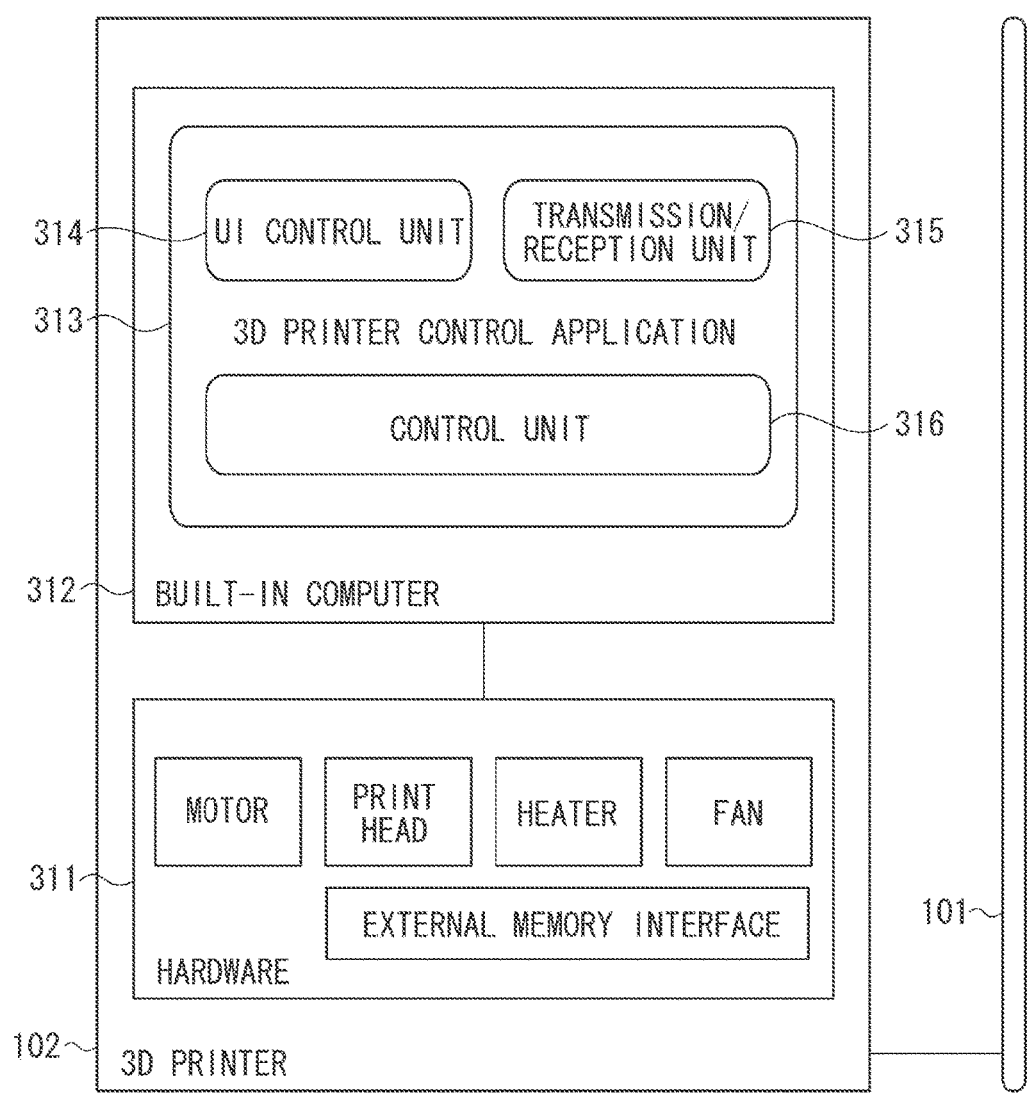
FIG. 3 illustrates an example of an internal configuration of a three-dimensional (3D) printer.

FIG. 3 illustrates an example of an internal configuration of the 3D printer 102.

A hardware portion (i.e., a forming unit) 311 can perform forming processing according to forming commands corresponding to forming data acquired via an appropriate interface. An internal hardware configuration of the 3D printer is differentiated according to a forming method. For example, a hardware configuration of the FDM type 3D printer includes at least a print head, a motor capable of driving a stage and the print head in x, y, and z axis directions, a heater capable of heating a nozzle of the print head, and a cooling fan. An aspect of the embodiments is applicable to a forming apparatus that performs a cutting and forming method or an additive manufacturing method. The additive manufacturing method includes a light forming method using a resin or specific liquid and metal powder or resin based powder sintering and plaster material based powder bonding. Further, the aspect of the embodiments is applicable to a forming apparatus that forms a three-dimensional object by fusing additive material sheet members according to a material sheet additive method.

A built-in computer 312 is a computer incorporated in the 3D printer 102. The built-in computer 312 can be manufactured at a low cost, compared to a general-purpose computer, because the built-in computer 312 is dedicated to special functions and does not include unnecessary functions, performances, and parts. However, a general-purpose computer (e.g., the information processing apparatus illustrated in FIG. 2) is employable as the built-in computer 312, if it can satisfy functions and performances required for the 3D printer.

A three-dimensional (3D) printer control application 313 is an application program that can run on the built-in computer 312. The 3D printer control application 313 includes a user interface (UI) control unit 314, a transmission/reception unit 315, and a control unit 316. In the disclosure, the information processing apparatus that executes the 3D printer control application 313 is referred to as "forming control apparatus". As a modified embodiment, an external computer is usable to execute the 3D printer control application 313 if it can control the hardware configuration (i.e. the forming unit) of the 3D printer 102.

The UI control unit 314 can control the user interface 201. The user interface 201 can be a liquid crystal display (LCD) device equipped with a touch panel or can be a downscale model constituted by a combination of a smaller LCD device capable of displaying characters in several rows and a predetermined number of hardware operation buttons. Further, the UI control unit 314 can be configured to function as a web server capable of controlling the display of a web browser that can run on a terminal, such as the client apparatus 103. The display control by the UI control unit 314 enables a user to confirm an operational state of the 3D printer. Further, the UI control unit 314 can accept a user operation via the user interface 201. The transmission/reception unit 315 can transmit and receive commands and data to and from an external device, such as the client apparatus 103 or the management system 104, via an appropriate interface. The control unit 316 causes each portion of the hardware portion 311 to operate according to a command received via the UI control unit 314 or the transmission/reception unit 315 or a command issued by the 3D printer control application 313, in such a way as to output an object and perform pre-processing/post-processing of the output.

Figure 4:
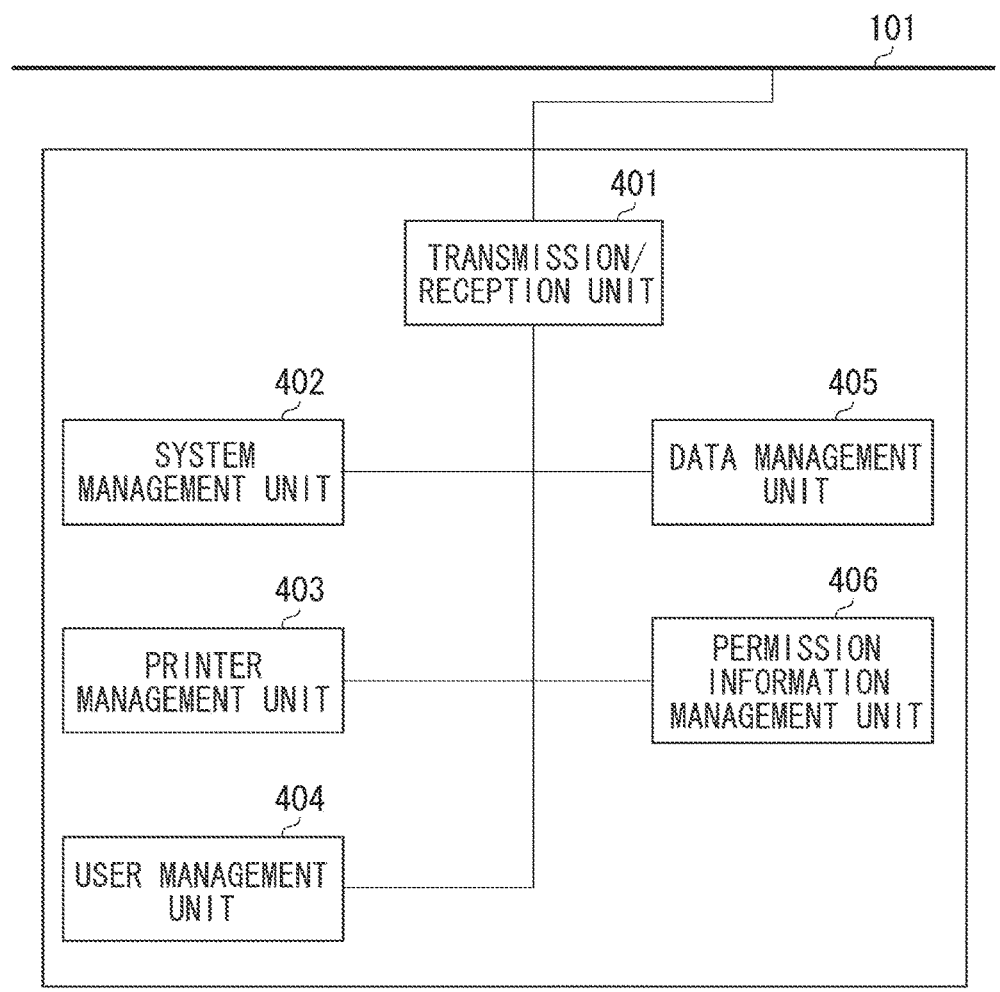
FIG. 4 illustrates an exemplary software configuration of a management system.

FIG. 4 illustrates an example of a module configuration of the software that runs on the management system 104. The configuration illustrated in FIG. 4 is a main part of the processing that can be realized when at least one server computer that constitutes the management system 104 executes the program according to an aspect of the embodiments. The illustrated configuration is a mere example and can be modified in an appropriate way if it can realize processing described below.

A transmission/reception unit 401 can transmit and receive various pieces of information to and from an external apparatus, such as the 3D printer 102 or the client apparatus 103, via the network. Further, the transmission/reception unit 401 can provide various management screens to the web browser that runs on the client apparatus 103 or another terminal.

A system management unit 402 can manage an operating state and settings of the management system 104. A printer management unit 403 can manage an operating state of each printer and settings managed by the management system 104. A user management unit 404 can manage information about each user who uses the management system 104. A data management unit 405 can manage forming data, such as model data, to be used in forming by the 3D printer 102 and attribute information attached to each forming data. A permission information management unit 406 can mainly manage a forming permission request received via the 3D printer 102 or the client apparatus 103 and related permission information.

FIG. 5 illustrates an example of printer information that can be managed by the printer management unit 403.

"Printer ID" is an identifier that can uniquely identify a target 3D printer to be managed. "Printer Name" is an arbitrary name that can facilitate the identification of 3D printer. "Registrant" is identification information about a requester (e.g., an organization or a user) that has requested the registration of the printer to the management system 104. A printer registration request can be transmitted from the 3D printer 102 or the client apparatus 103 to the management system 104 via the network. Alternatively, a printer owner can use a paper medium or a comparable off-line medium to transmit the printer registration request to an administrator of the 3D management system. "Registration Date" is a date on which the printer has been registered in the management system 104. "Expiration Date" is a date until which the printer can be used. If the expiration date has passed, the management system 104 determines that the corresponding printer cannot be used any more. Therefore, if necessary, the registrant is to perform a procedure for postponing the expiration date of the printer according to a method similar to the printer registration method. "Maker" is a manufacturer of the printer. "Model" is a model name of the printer.

The management system 104 is a forming apparatus that can perform safe and precise forming processing. The management system 104 can be configured to request a predetermined approval institute to perform an approval work for an apparatus to be subjected to periodical legal maintenance and register an approved 3D printer as a management target. The above-mentioned configuration can realize a highly advanced device management that can satisfy both of excellent performance and appropriate state/installation environment, which are generally required in the medical field.

FIGS. 6A and 6B illustrate examples of the user information that can be managed by the user management unit 404. FIG. 6A illustrates printer administrator information. FIG. 6B illustrates user information. The user is an owner of forming data (e.g. model data) and is a person who has the role of permitting (or approving) the implementation of forming. The printer administrator is a forming implementer who instructs or operates the 3D printer 102 to perform a forming operation based on user's permission (or approval). For example, in the medical field, the user is a patient. The printer administrator is a worker (e.g., a physician) belonging to a medical institution. The forming data is model data of, for example, a tooth form or an organ of a patient itself.

In FIG. 6A, "Printer Administrator ID" is an identifier that can uniquely identify each printer administrator. "Password" is a character string that is known by only the printer administrator. "Registration Date" is a date on which the printer administrator has been registered in the management system 104. "Printer ID" is a printer ID of the 3D printer 102 that can be used by the printer administrator. The exemplary information illustrated in FIG. 6A indicates that two printer administrators (i.e., A001 and A002 in printer administrator ID) can use the same 3D printer 102 (i.e., P0001 in printer ID).

In FIG. 6B, "User ID" is an identifier that can uniquely identify each user. "Password" is a character string that is known by only the printer administrator. "Registration Date" is a date on which the user has been registered in the management system 104. A personal identity number issued by a public institution can be used as the "user ID".

Similar to the 3D printer registration illustrated in FIG. 5, a registration request can be transmitted to the management system 104 via the network to register the printer administrator and the user. Alternatively, a printer owner can use a paper medium or a comparable off-line medium to transmit the registration request to an administrator of the 3D management system.

FIG. 7 illustrates an example of the forming data that can be managed by the data management unit 405.

"Forming Data ID" is an identifier that can uniquely identify each piece of forming data. "Forming Data Name" is an arbitrary name that can facilitate the identification of forming data. "User ID" is identification information about a user who can approve the utilization of the forming data, which is managed by the user management unit 404 as illustrated in FIG. 6B. "Registration Date" is a date on which the forming data has been registered in the management system 104. "Forming Data" is the substance of forming data itself or link information about a file path or a uniform resource locator (URL) indicating the place where the data is located.

"Printer ID" indicates a 3D printer that can perform forming processing based on the forming data and can be managed by the printer management unit 403 as illustrated in FIG. 5. According to the exemplary information illustrated in FIG. 7, no printer ID is designated for the forming data whose forming data ID is M0000001. It indicates that any 3D printer is usable to perform the forming processing based on the corresponding forming data. On the other hand, when the forming data ID is M0000002, only the 3D printer having a printer ID=P00001 can perform forming processing based on the corresponding forming data.

The forming data and the printer ID are linkable information that can be set by the printer administrator based on user's approval. Such a linking can prevent any non-approved (or non-authorized) 3D printer from performing the forming processing.

FIG. 8 illustrates an example of a forming data registration screen that can be displayed by the user interface 201 of the management system 104. Alternatively, the web browser that runs on the client apparatus 103 or another terminal or the UI control unit 314 of the 3D printer 102 can receive, via the network 101, and display the screen displayed by the user interface 201 of the management system 104.

The forming data registration screen illustrated in FIG. 8 includes a user authentication information field 801 and a forming data field 802. Each user (i.e., an owner of forming data to be registered) can input a user ID and a password in the user authentication information field 801. Further, the user can input a name of the forming data to be registered, the forming data itself, and an encryption password of the forming data in the forming data field 802. If the user presses a reference button 803, the terminal that displays the screen illustrated in FIG. 8 displays a dialog that enables the user to select a forming data file. If the user presses a registration button 804, the terminal transmits a forming data registration request to the management system 104 based on the input contents.

The above-mentioned encryption password is usually prepared when a user input work is required to decrypt the registered forming data, although the encryption password is not an essential feature of the disclosure. The above-mentioned encryption of forming data can be replaced by performing encryption in such a manner that only the management system 104 or a 3D printer registered in the management system 104 can decrypt the forming data.

According to the exemplary information illustrated in FIG. 8, operating the reference button 803 selects a forming data file. However, if a forming data editing application (e.g., 3DCAD) is available to directly transmit the forming data registration request to the management system 104, it will be unnecessary to use the screen illustrated in FIG. 8. In this case, the forming data can be safely registered to the management system because temporarily storing the forming data in the terminal as illustrated in FIG. 8 is unnecessary.

Figure 9:
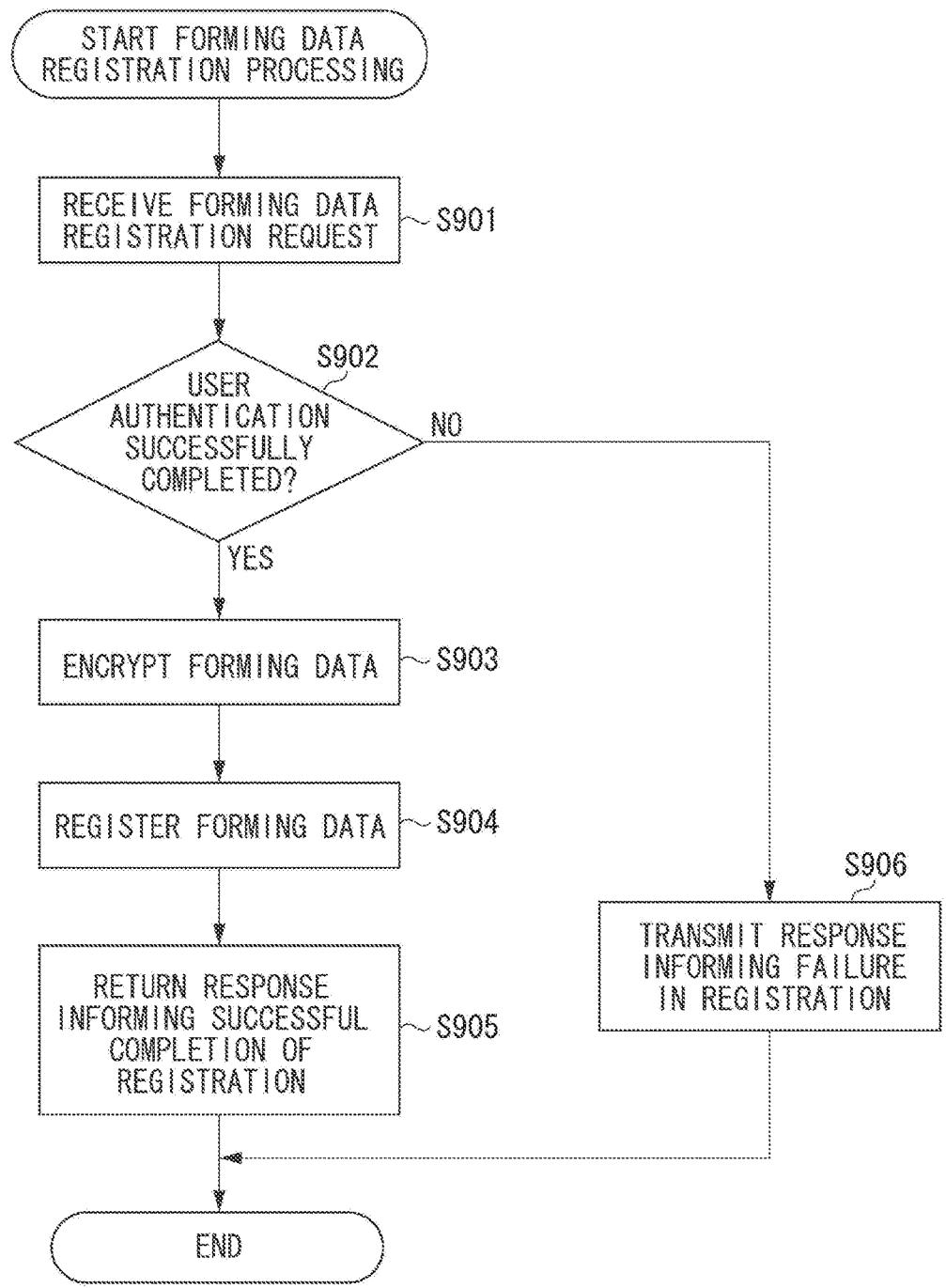
FIG. 9 is a flowchart illustrating forming data registration processing that can be performed by the management system.

FIG. 9 is a flowchart illustrating forming data registration processing that can be performed by the management system 104. The data management unit 405 can perform the processing of the flowchart illustrated in FIG. 9. More specifically, to realize the processing of the flowchart illustrated in FIG. 9, the CPU 203 reads and executes a related program recorded in the secondary storage apparatus 206.

In step S901, the data management unit 405 accepts a forming data registration request from the transmission/reception unit 401. In step S902, the data management unit 405 determines whether user authentication information included in the forming data registration request received in step S901 is correct, via the user management unit 404. According to the exemplary information illustrated in FIG. 8, if a user ID and a password included in the registration request coincide with the user information managed by the user management unit 404, the data management unit 405 determines that the user authentication has been successfully completed. If the data management unit 405 determines that the user authentication has been successfully completed (Yes in step S902), the operation proceeds to step S903. If the data management unit 405 determines that the user authentication has been failed (No in step S902), the operation proceeds to step S906. In step S906, the data management unit 405 causes the transmission/reception unit 401 to transmit a response informing the failure in the forming data registration to the transmission source of the registration request. Subsequently, the data management unit 405 terminates the processing of the flowchart illustrated in FIG. 9.

In step S903, the data management unit 405 encrypts a target forming data of the registration request received in step S901. According to the exemplary information illustrated in FIG. 8, the data management unit 405 encrypts the forming data with a key generated based on a character string included in the encryption password. In this case, the data management unit 405 starts the decryption in response to the input of the encryption password.

In step S904, the data management unit 405 stores the forming data encrypted in step S903 in the secondary storage apparatus 206 or an external storage service connected to the management system 104 via the network.

In step S905, the data management unit 405 causes the transmission/reception unit 401 to return a response informing the successful completion of the forming data registration to the transmission source of the registration request. The response transmitted in step S905 includes the forming data ID determined when the forming data has been stored in step S904. Subsequently, the data management unit 405 terminates the processing of the flowchart illustrated in FIG. 9.

The user authentication information to be used in step S902 is not limited to the combination of a user ID and a password. For example, the user authentication information can be any other personal information that can identify each individual user, such as full name, personal identity number, passport number, driver's license number, bio-information (e.g., fingerprint), date of birth, or telephone number. Further, the processing of step S902 can be omitted if an off-line user authentication is feasible beforehand by visually confirming, for example, a passport that includes a photograph of face, because it is unnecessary to input the user authentication information illustrated in FIG. 8.

Further, the forming data encryption in step S903 can be performed by using the above-mentioned personal information instead of using the password illustrated in FIG. 8. In this case, the personal information can be entered via the screen illustrated in FIG. 8. Alternatively, the personal information can be entered beforehand in the registration of each user (although not illustrated in FIG. 6).

Further, in a case where the registration request does not include any encryption password having been designated beforehand, the encryption processing can be performed by using a secret key (i.e., a cryptographic key) safely managed by the management system 104 or a cryptographic key generated every time when the forming data registration processing is performed, instead of using the above-mentioned personal information. In this case, the encryption processing is performed in such a manner that only the 3D printer having been registered beforehand in the management system can perform decryption. Further, in the case where the decryption key is generated every time when the forming data registration processing is performed, the decryption key can be later distributed to only the target 3D printer designated in FIG. 10.

FIG. 10 illustrates an example of a forming permission request setting screen that can be provided by the management system 104. Each user or a printer administrator authorized by the user can operate the forming permission request setting screen.

The forming permission requests setting screen includes a forming data field 1001 and a printer information field 1002. Each user can input forming data identification information in the forming data field 1001. According to the exemplary information illustrated in FIG. 10, the information input in the forming data field 1001 is the forming data ID. Each user can input identification information about a 3D printer to be used in the forming processing in the printer information field 1002. According to the exemplary screen illustrated in FIG. 10, the user can arbitrarily designate a desired printer from a list of 3D printers having been registered beforehand in the management system 104. The list can include an option of designating no 3D printer.

The forming permission request setting screen can be modified in such a manner that each user can designate a target 3D printer that is not yet registered in the management system 104.

If a transmission button 1003 is pressed, a forming permission request can be transmitted to the management system 104 based on input information.

FIG. 11 illustrates an example of a forming permission confirmation screen that can be provided by the management system 104. Each user or a printer administrator authorized by the user can operate the forming permission confirmation screen.

The forming permission confirmation screen includes a forming data field 1101, a printer information field 1102, and a confirmation message 1103. The forming data field 1101 displays information relating to the forming data specified through the forming data field 1001, which can be acquired from the data management unit 405. The printer information field 1102 displays information about the printer specified through the printer information field 1002, which can be acquired from the printer management unit 403. The confirmation message 1103 inquires about whether to permit the forming processing. If the user authentication information (e.g., user ID and password) registered in the management system 104 is input and a transmission button 1104 is pressed, a forming permission confirmation response including the information having been input via the forming permission confirmation screen illustrated in FIG. 11 can be transmitted to the management system 104. If authentication processing is performed based on the entered user authentication information, the management system 104 can determine that the utilization of the forming data designated in the forming data field 1001 has been approved by the user.

FIG. 12 illustrates an example of a forming permission completion screen that can be provided by the management system 104. A forming permission information field 1201 displays forming permission information that can be generated by the management system 104, as described in detail below with reference to FIG. 14. A forming information 1202 displays forming data of a forming subject and information about the 3D printer 102 having been input via the screens illustrated in FIGS. 8 and 10.

Figure 13:
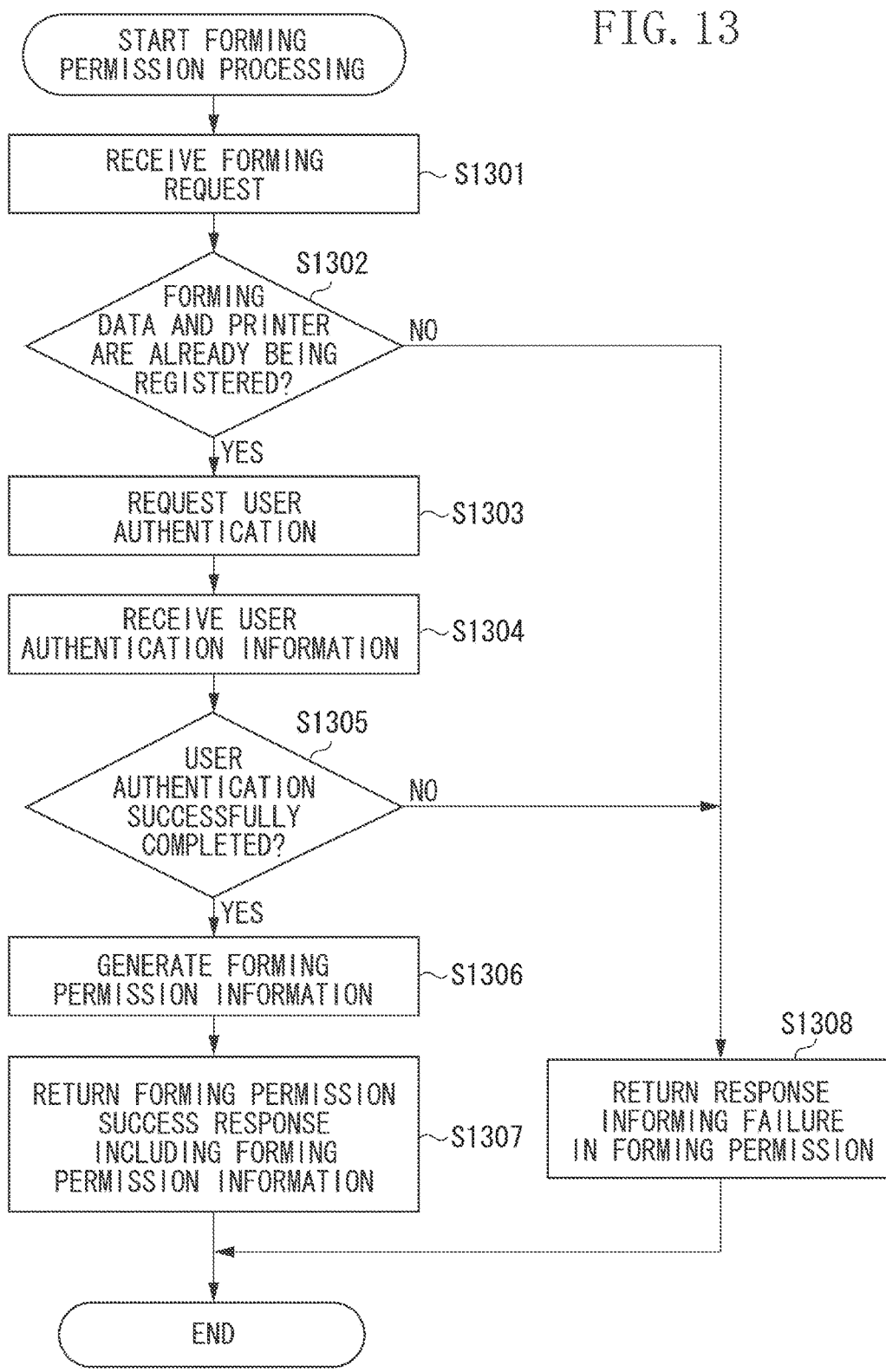
FIG. 13 is a flowchart illustrating forming permission processing that can be performed by the management system.

FIG. 13 is a flowchart illustrating an exemplary flow of forming permission processing that can be performed by the management system 104. The permission information management unit 406 can perform the processing illustrated in FIG. 13. More specifically, to realize the processing illustrated in FIG. 13, the CPU 203 reads and executes a related program recorded in the secondary storage apparatus 206.

In step S1301, the permission information management unit 406 receives a forming request that requires forming permission (hereinafter, referred to as "forming permission request") from the transmission/reception unit 401. The forming permission request includes the information having been entered via the screen illustrated in FIG. 10.

In step S1302, the permission information management unit 406 determines whether the forming data and the printer information included in the forming permission request received in step S1301 coincide with the information managed by the data management unit 405 and the printer management unit 403. If the permission information management unit 406 determines that there is information coincident in both of the forming data and the printer information (Yes in step S1302), the operation proceeds to step S1303. If the permission information management unit 406 determines that there is not any information coincident in both of the forming data and the printer information (No in step S1302), the operation proceeds to step S1308.

In step S1303, the permission information management unit 406 requests user authentication information. Specifically, the permission information management unit 406 causes the transmission/reception unit 401 to transmit information required to display the forming permission confirmation screen illustrated in FIG. 11 to the request source of the forming permission request. In step S1304, the permission information management unit 406 receives the user authentication information from the transmission/reception unit 401. The user authentication information includes the information having been input via the forming permission confirmation screen illustrated in FIG. 11.

In step S1305, the permission information management unit 406 determines whether the user authentication information having been received in step S1304 is correct. According to the exemplary information illustrated in FIG. 11, if the user ID and the password included in the forming data registration request coincide with the user information managed by the user management unit 404 and the user ID included in the forming data registration request coincides with the user ID corresponding to the forming data managed by the data management unit 405, the permission information management unit 406 determines that the user authentication has been successfully completed. If the permission information management unit 406 determines that the user authentication has been successfully completed (Yes in step S1305), the operation proceeds to step S1306. If the permission information management unit 406 determines that the user authentication has been failed (No in step S1305), the operation proceeds to step S1308. When the user authentication has been successfully completed as mentioned above, the management system 104 can determine that the user has approved the utilization of the forming data to be subjected to the forming processing. Further, the processing of steps S1303 to S1305 can be omitted if an off-line user authentication is feasible beforehand to approve the utilization of forming data by visually confirming, for example, a passport that includes a photograph of face, because it is unnecessary to input the user authentication information illustrated in FIG. 11.

In step S1306, the permission information management unit 406 generates forming permission information. The forming permission information will be described in detail below with reference to FIG. 14. In step S1307, the permission information management unit 406 returns a forming permission success response including the forming permission information to the request source of the forming permission request. Specifically, the permission information management unit 406 causes the transmission/reception unit 401 to transmit information required to display the forming permission completion screen illustrated in FIG. 12 to the request source.

In step S1308, the permission information management unit 406 causes the transmission/reception unit 401 to transmit a response informing the failure in the forming permission to the request source of the forming permission request.

Similar to step S902, the user authentication information to be used in step S1305 is not limited to the combination of a user ID and a password. For example, the user authentication information can be personal information. In this case, it is unnecessary to input the user authentication information in FIG. 11 if an off-line user authentication is feasible beforehand. It is only required to press a forming permission button (i.e., the transmission button 1104).

FIG. 14 illustrates an example of the forming permission information that can be managed by the permission information management unit 406.

"Forming Code" is an identifier that can uniquely identify the forming permission information generated in step S1306. "Forming Permission Date" is a date on which the forming permission information has been generated. "Expiration Date" is a date until which the forming permission information is continuously valid. The expiration date can be determined according to system settings (not illustrated) managed by the system management unit 402, can be set beforehand for each piece of forming data input through the screen illustrated in FIG. 8, or can be set each time the permission information is generated through the screen illustrated in FIG. 10.

"Printer ID" is a printer ID of a 3D printer that has been permitted to perform forming processing with the registration permission information. "Forming Data ID" is a unique ID of forming data whose forming has been permitted with the registration permission information.

"Status" indicates the status of forming processing permitted with the forming permission information. More specifically, "forming failure", "forming success", "forming in progress", and "unexecuted" are examples of the status. Exemplary processing to be performed when the forming has been failed will be described in detail below with reference to FIG. 18. "Abandonment Status" is information indicating whether the formed object has been discarded. Updated abandonment status information can be transmitted from the 3D printer 102, the client apparatus 103, or a discarding apparatus (not illustrated) to the management system 104 via the network. Alternatively, a printer owner can use a paper medium or a comparable off-line medium to transmit the updated abandonment status information to an administrator of the 3D management system so that the administrator can perform a manual update work.

FIGS. 15A and 15B illustrate exemplary forming implementation instruction screens that can be displayed and controlled by the UI control unit 314 of the 3D printer 102.

FIG. 15A illustrates a forming code input screen, which includes a text box 1501 into which a forming code can be input. The forming code is a part of the forming permission information generated after the user authentication in FIG. 13. The screen illustrated in FIG. 12 can be used to notify the user or a printer administrator approved by the user of the forming code. Although not described in the disclosure, the 3D printer 102 can perform user authentication independently before or after the above-mentioned timing. If an appropriate forming code is input and an OK button 1502 is pressed on the forming code input screen illustrated in FIG. 15A, the screen illustrated in FIG. 15B can be displayed.

FIG. 15B illustrates an exemplary forming data confirmation screen. The forming data confirmation screen displays attribute information (e.g., data ID and data name) of forming data corresponding to the forming code having been input via the screen illustrated in FIG. 15A. If an execution button 1503 is pressed, the 3D printer control application 313 performs forming processing illustrated in FIG. 16. If the OK button 1502 is pressed in a state where a record including the forming code having been input in the text box 1501 is not present in the forming permission information managed by the permission information management unit 406, the forming data confirmation screen illustrated in FIG. 15B is not displayed and an error screen (not illustrated) is displayed. In such a case, the forming data is not subjected to the decryption processing and the forming processing.

3D printer software, such as a driver program running on the client apparatus 103, or an appropriate web browser installed on each apparatus in the network system can be configured to display the screens illustrated in FIGS. 15A and 15B. In this case, input contents can be transmitted to the 3D printer 102 via the network 101.

FIG. 16 is a flowchart illustrating an exemplary flow of the forming processing that can be performed by the 3D printer 102. To realize the processing of the flowchart illustrated in FIG. 16, the CPU 203 executes the 3D printer control application 313.

In step S1601, the UI control unit 314 accepts the entry of a forming code via the screens illustrated in FIG. 15A. In step S1602, the transmission/reception unit 315 transmits the forming code having been entered in step S1601 to the management system 104 via the network interface 202.

In step S1603, the control unit 316 determines whether forming data corresponding to the input forming code has been acquired from the management system 104. If the control unit 316 determines that the forming data has been acquired (Yes in step S1603), the operation proceeds to step S1604. If the control unit 316 determines that the forming data has not been acquired (No in step S1603), the operation proceeds to step S1609. For example, in a case where the input forming code or forming data corresponding to the input forming code is not yet registered in the management system, or when the expiration date of the input forming code has already passed, the forming data cannot be acquired.

In step S1604, the control unit 316 performs the forming processing based on the acquired forming data. The example illustrated in FIG. 15B displays the confirmation screen before starting the forming processing, although it is not explicitly described in the flowchart illustrated in FIG. 16. The forming processing includes decrypting the forming data with a decryption key provided beforehand from the management system 104. Further, in a case where the forming data is model data for a 3D object, the control unit 316 converts the forming data into control commands describing the forming control of each forming surface for the additive manufacturing and then performs the forming processing.

In step S1605, the control unit 316 determines whether the forming processing has been successfully completed. If the control unit 316 determines that the forming processing has been successfully completed (Yes in step S1605), the operation proceeds to step S1606. If the control unit 316 determines that the forming processing has been failed (No in step S1605), the operation proceeds to step S1607.

In step S1606, the transmission/reception unit 315 notifies the management system 104 of the result that the forming processing has been successfully completed, via the network interface 202. In response to the notification from the transmission/reception unit 315, the management system 104 updates the forming permission information illustrated in FIG. 14 in such a way as to describe "forming success" in the "status" field of a corresponding record if the record contains the above-mentioned forming code. As a modified embodiment, the UI control unit 314 can be configured to notify the forming completion via the user interface 201 of the 3D printer.

In step S1607, the transmission/reception unit 315 notifies the management system 104 of the result that the forming processing has been failed, via the network interface 202. For example, if an error occurs in the 3D printer or processing at least a part of the forming data is difficult, the forming processing will be failed. In response to the notification from the transmission/reception unit 315, the management system 104 performs forming failure processing illustrated in FIG. 18. In step S1608, the UI control unit 314 displays a new forming code received from the management system 104.

In step S1609, the UI control unit 314 causes the user interface 201 of the 3D printer to display a message informing that implementing the forming is unfeasible.

Figure 17:
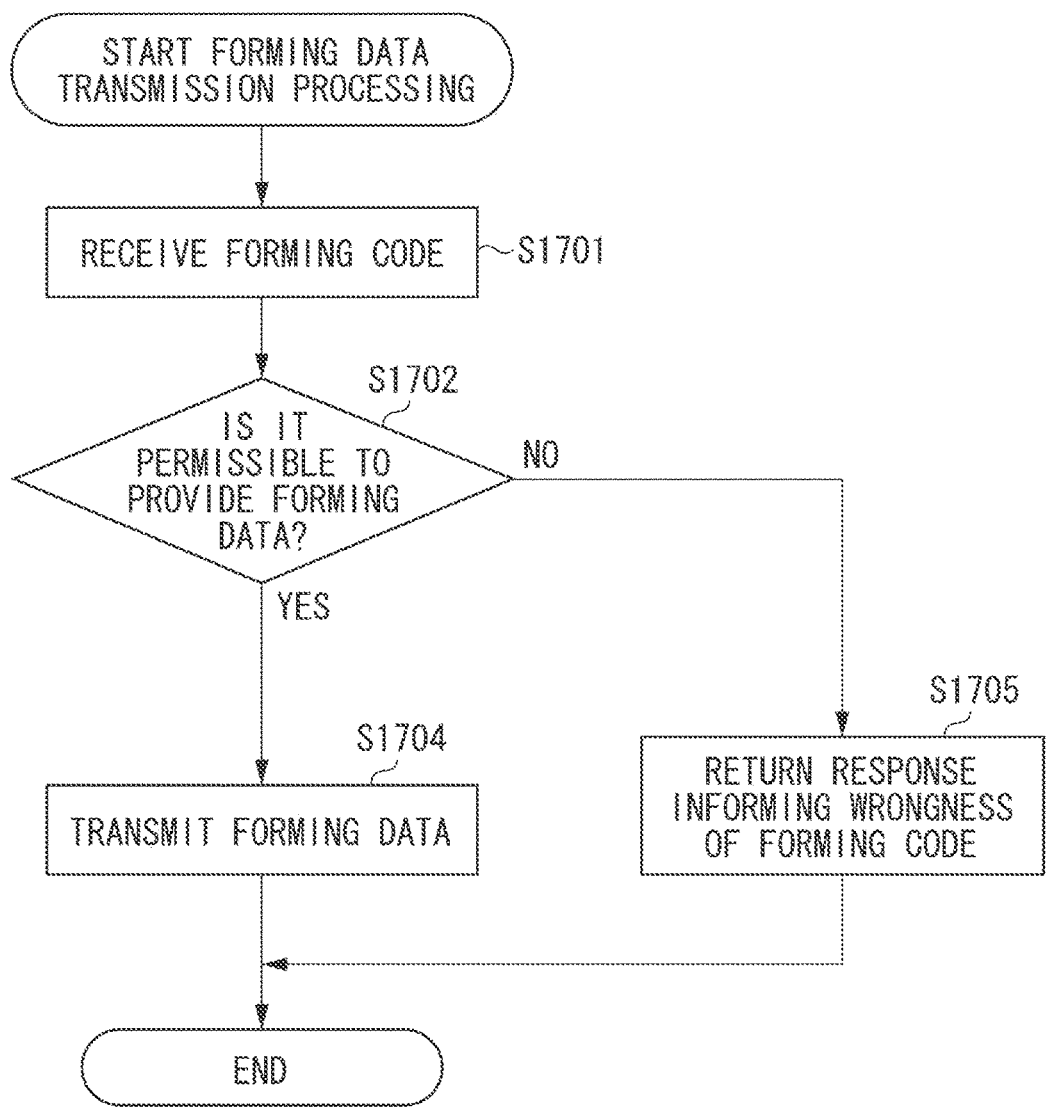
FIG. 17 is a flowchart illustrating forming data transmission processing that can be performed by the management system.

FIG. 17 is a flowchart illustrating forming data transmission processing that can be performed by the management system 104. The data management unit 405 can perform the processing illustrated in FIG. 17. More specifically, to realize the processing illustrated in FIG. 17, the CPU 203 reads and executes a related program recorded in the secondary storage apparatus 206.

In step S1701, the data management unit 405 receives the forming code transmitted in the above-mentioned processing of step S1602, via the transmission/reception unit 401.

In step S1702, the data management unit 405 determines whether it is permissible to provide forming data corresponding to the received forming code to the transmission source 3D printer. More specifically, if it is confirmed from the table illustrated in FIG. 14 that the forming code received in step S1701 is managed within the expiration date and the printer ID corresponding to the forming code indicates the transmission source 3D printer, the data management unit 405 determines that providing the forming data is permissible. If the data management unit 405 determines that providing the forming data is permissible (Yes in step S1702), the operation proceeds to step S1704. If the data management unit 405 determines that providing the forming data is not permissible (No in step S1702), the operation proceeds to step S1705.

In step S1704, the data management unit 405 causes the transmission/reception unit 401 to transmit the forming data corresponding to the received forming code to the 3D printer 102 (i.e., the transmission source of the forming code). In step S1705, the data management unit 405 causes the transmission/reception unit 401 to transmit a response informing the difficulty in providing the forming data because of wrongness of the forming code to the 3D printer 102 (i.e., the transmission source).

If the management system 104 is configured to decrypt the forming data before the above-mentioned data transmission in step S1704, the 3D printer will not be required to perform the decryption processing.

Figure 18:
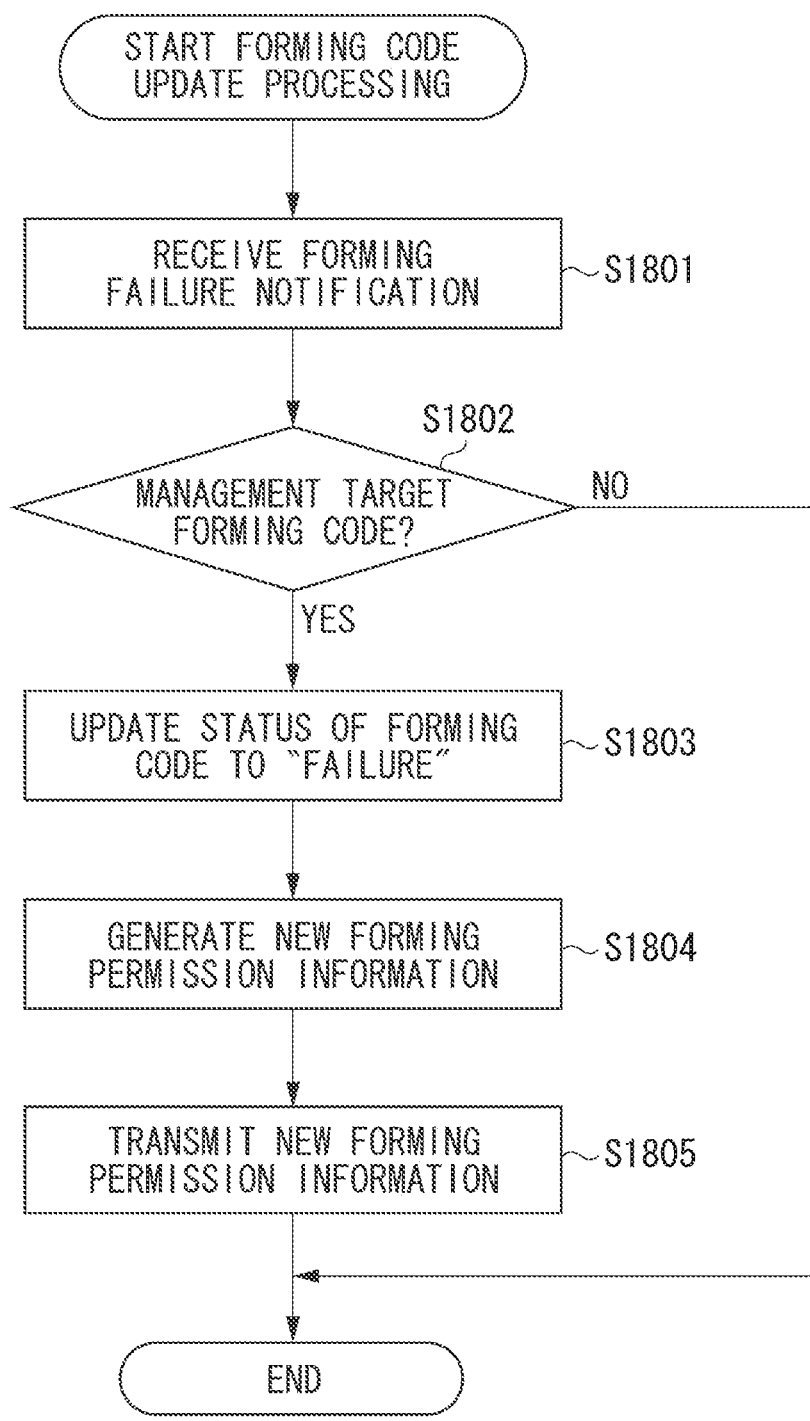
FIG. 18 is a flowchart illustrating processing, at the time of forming failure, that can be performed by the management system.

FIG. 18 is a flowchart illustrating processing that can be performed by the management system 104 when the 3D printer 102 has failed the forming processing. The permission information management unit 406 can perform the processing illustrated in FIG. 18. More specifically, to realize the processing illustrated in FIG. 18, the CPU 203 reads and executes a related program recorded in the secondary storage apparatus 206.

In step S1801, the permission information management unit 406 receives the forming failure notification transmitted in the above-mentioned processing of step S1607, via the transmission/reception unit 401.

In step S1802, the permission information management unit 406 determines whether the forming code included in the forming failure notification received in step S1801 is present in the forming permission information illustrated in FIG. 14. If the permission information management unit 406 determines that the forming code is present in the forming permission information (Yes in step S1802), the operation proceeds to step S1803. If the permission information management unit 406 determines that the forming code is not present in the forming permission information (No in step S1802), the permission information management unit 406 terminates the forming code update processing of the flowchart illustrated in FIG. 18.

In step S1803, the permission information management unit 406 updates the forming permission information illustrated in FIG. 14 in such a way as to describe "failure" in the "status" field of a corresponding record if the record contains the above-mentioned forming code included in the received forming failure notification.

In step S1804, the permission information management unit 406 generates new forming permission information by using printer ID and forming data ID that accord with the forming permission information. A forming code issued in this case is different from the forming code included in the forming failure notification.

In step S1805, the permission information management unit 406 causes the transmission/reception unit 401 to transmit the forming permission information newly generated in step S1804 to the 3D printer 102 (i.e., the transmission source of the forming failure notification).

The above-mentioned processing in steps S1804 and S1805 is not required processing. For example, the permission information management unit 406 can be configured to perform the processing in steps S1804 and S1805 only when the cause of the forming failure in the 3D printer 102 is a malfunction of the 3D printer.

Figure 19:
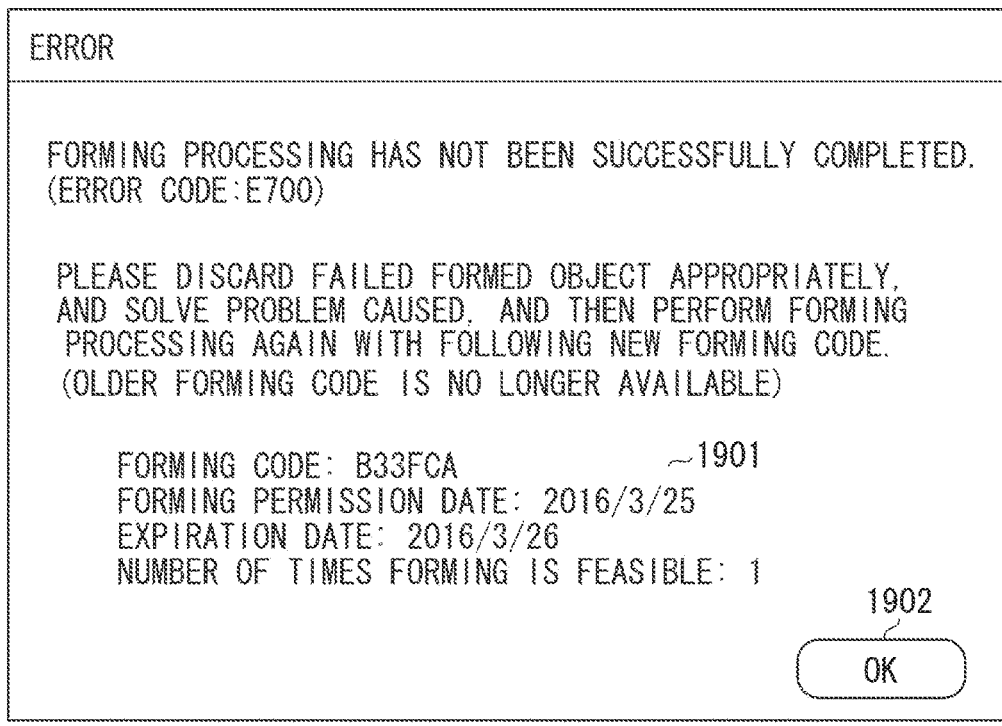
FIG. 19 illustrates an example of a forming failure screen that can be provided by the 3D printer.

FIG. 19 illustrates an example of a forming failure screen, the display of which can be controlled by the UI control unit 314 of the 3D printer 102.

The forming failure screen illustrated in FIG. 19 includes the forming permission information 1901, which has been newly received from the management system 104 in step S1805. A user can press an OK button 1902 to close the forming failure screen. Further, the user can input the forming code included in the forming permission information 1901 into the forming code input screen illustrated in FIG. 15A to perform the forming processing again by using the same forming data.

In the above-mentioned exemplary embodiment, the input information used in the processing illustrated in FIG. 16 is the forming code only. However, to emphasize the security, it will be useful to additionally request the entry of user authentication information, as mentioned above. In this case, in the processing of the flowchart illustrated in FIG. 17, the management system 104 verifies not only the forming code but also the transmission target forming data and the requested user authentication information.

According to the first exemplary embodiment, the management system encrypts and manages forming data and designates a limited number of 3D printers that can perform forming processing, and requests a user (i.e., an owner of the forming data) to permit the usage of the forming data, so that unauthorized forming can be prevented.

A second exemplary embodiment employs the configurations illustrated in FIGS. 1 to 11, 13, and 14. Constituent components and portions similar to those described in the first exemplary embodiment are denoted by the same reference numerals and redundant description thereof will be avoided. Hereinafter, features different from those described in the first exemplary embodiment will be chiefly described.

FIG. 20 illustrates an example of the forming permission completion screen that can be provided by the management system 104. The forming permission completion screen illustrated in FIG. 20 is basically identical to the screen illustrated in FIG. 12 and is different in that the forming data is downloadable. A download button 2001 enables a user to download the forming data from the management system 104 and store the downloaded forming data.

It is assumed that the downloaded forming data includes, as meta information thereof, a part or the whole of the forming permission information illustrated in FIG. 14. Specifically, the downloaded forming data includes the information described in the "Forming Code", "Expiration Date", "Printer ID", and "Status" fields. Alternatively, the downloaded forming data can include, as meta information, only the information described in the "Forming Code" field. Further, the 3D printer control application 313 can be configured to edit a part of the above-mentioned meta information (e.g., "Status"). Further, it is assumed that the meta information is encrypted information. The meta information is recorded as attribute of model data that serves as forming data. However, the meta information can be recorded as another data, such as forming control ticket data included in the forming data.

Figure 21:
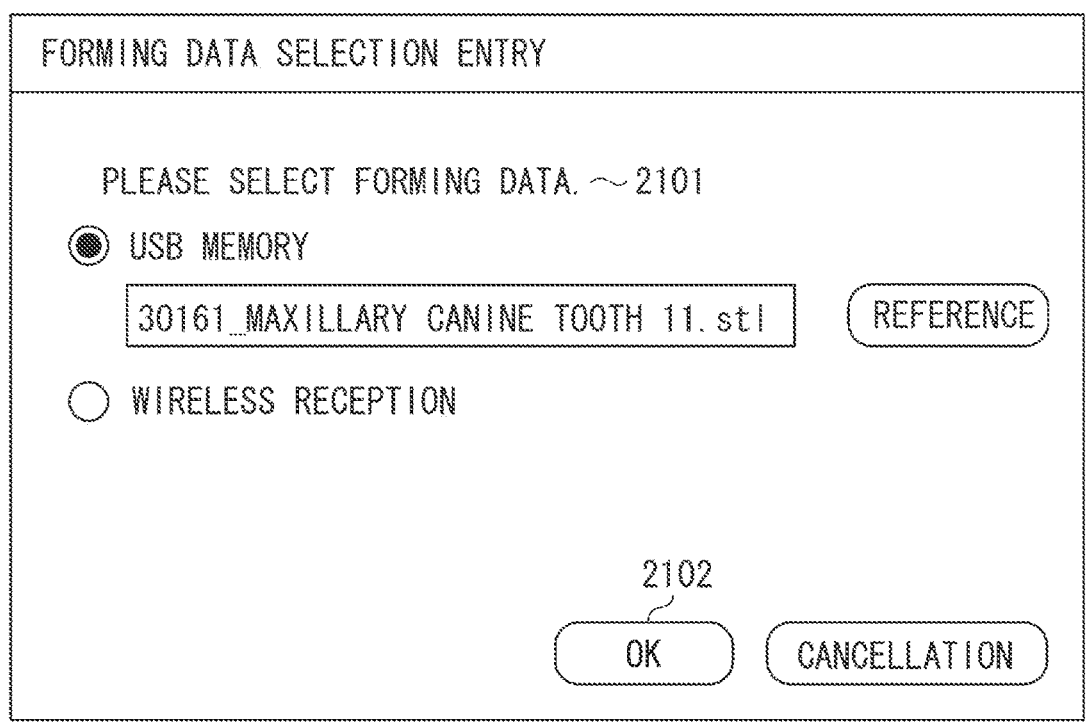
FIG. 21 illustrates an example of a forming data selection screen that can be provided by the 3D printer according to the second exemplary embodiment.

FIG. 21 illustrates an example of a forming data selection screen that can be provided by the UI control unit 314 of the 3D printer 102.

The forming data selection screen displays a message 2101 that requests a user to select desired forming data. According to the example illustrated in FIG. 21, selectable items are USB memory and wireless communication (e.g., infrared ray or WiFi connection) although other options can be added to select the desired forming data. For example, the forming data can be received from the client apparatus 103 via the network 101 or by accessing a corresponding URL (i.e., address of information on the internet). More specifically, the 3D printer 102 can acquire the forming data downloaded via the forming permission completion screen illustrated in FIG. 20 from a device other than the management system. If an OK button 2102 is pressed, the 3D printer control application 313 performs forming processing illustrated in FIG. 23.

Figure 22:
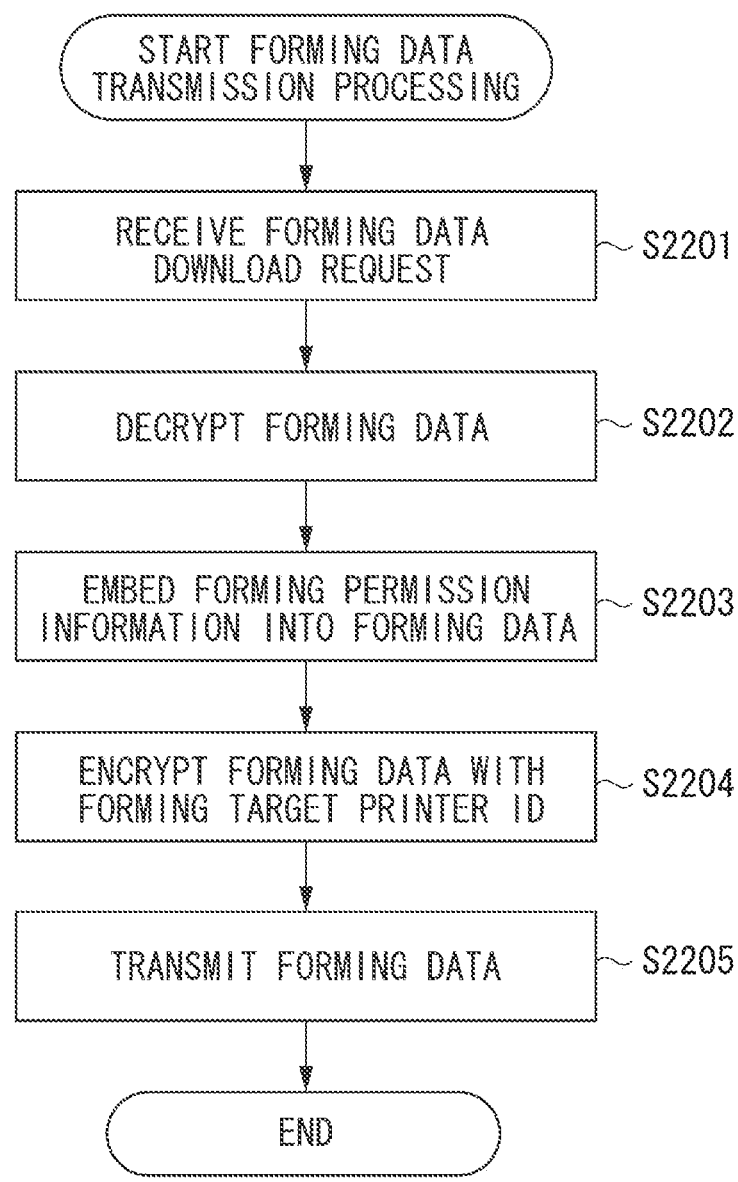
FIG. 22 is a flowchart illustrating forming data transmission processing that can be performed by the management system according to the second exemplary embodiment.

FIG. 22 is a flowchart illustrating forming data transmission processing that can be performed by the management system 104. The data management unit 405 can perform the processing of the flowchart illustrated in FIG. 22. More specifically, to realize the processing illustrated in FIG. 22, the CPU 203 reads and executes a related program recorded in the secondary storage apparatus 206.

In step S2201, the data management unit 405 receives a forming data download request from the transmission/reception unit 401.

In step S2202, the data management unit 405 performs decryption processing on forming data designated by the download request. In step S2203, the data management unit 405 embeds specific information included in the forming permission information managed in FIG. 14 into the forming data. Specifically, as mentioned above, the data management unit 405 additionally writes various types of information, such as the "Forming Code" illustrated in FIG. 14, as meta information of the forming data, into the forming data.

In step S2204, the data management unit 405 performs encryption processing on the forming data into which the forming permission information has been embedded in step S2203 in such a manner that the encrypted forming data can be decrypted by the 3D printer specified by the forming permission information. In other words, the processing performed by the data management unit 405 can prevent other 3D printers from performing the forming processing. A printer ID of the target 3D printer can be referred to in the encryption processing.

In step S2205, the data management unit 405 causes the transmission/reception unit 401 to transmit the forming data.

Figure 23:
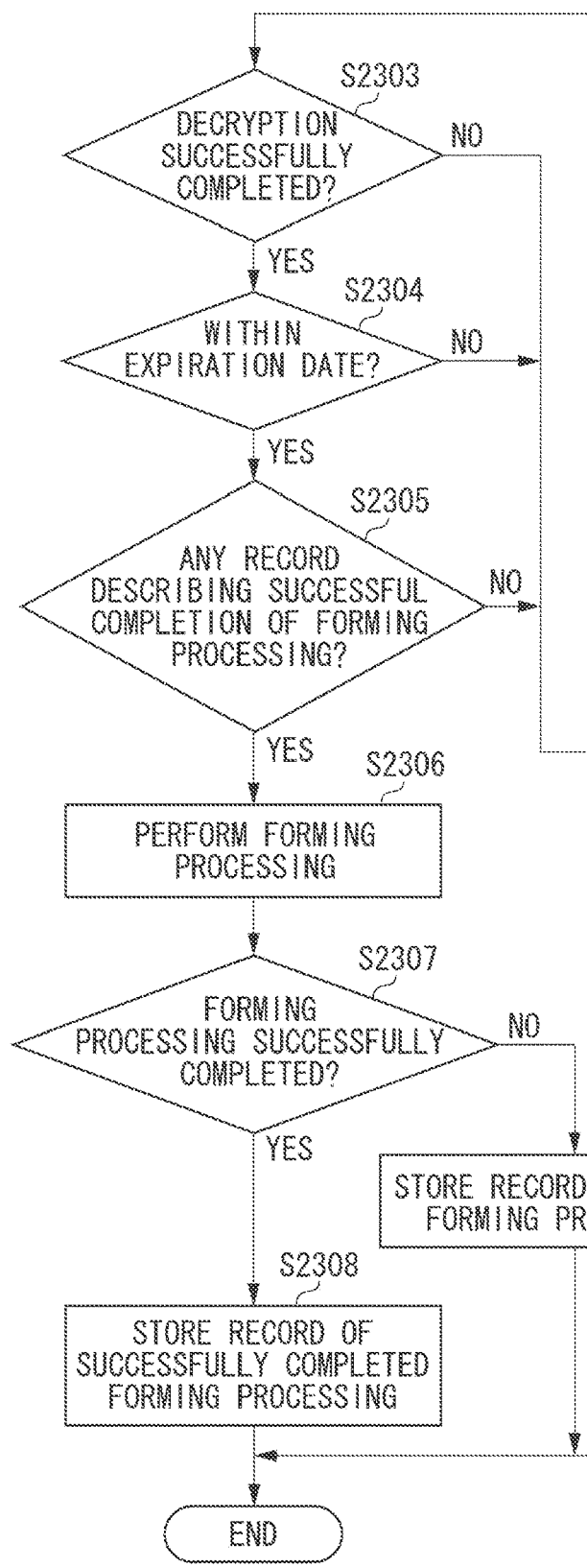
FIG. 23 is a flowchart illustrating forming processing that can be performed by the 3D printer according to the second exemplary embodiment.

FIG. 23 is a flowchart illustrating forming processing that can be performed by the 3D printer 102. The processing illustrated in FIG. 23 can be realized by executing the 3D printer control application 313.

In step S2301, the control unit 316 accepts the entry of forming data via a path selected on the forming data selection screen (see FIG. 21) provided by the UI control unit 314.

In step S2302, the control unit 316 performs decryption processing on the entered forming data. In a case where the printer ID of the target 3D printer is referred to in the encryption processing, the printer ID of the 3D printer 102 itself can be used to perform the decryption processing. If a decryption key is already distributed from the management system 104, the distributed key can be used to perform the decryption processing. In step S2303, the control unit 316 determines whether the decryption processing has been successfully completed. If the control unit 316 determines that the decryption processing has been successfully completed (Yes in step S2303), the operation proceeds to step S2304. If the control unit 316 determines that the decryption processing has been failed (No step S2303), the operation proceeds to step S2310.

In step S2304, the control unit 316 extracts the "Expiration Date" information from the forming permission information included in the forming data and determines whether the current time is within the expiration date. If the control unit 316 determines that the current time is within the expiration date (Yes in step S2304), the operation proceeds to step S2305. If the control unit 316 determines that the current time is not within the expiration date (No in step S2304), the operation proceeds to step S2310. If the forming data does not include the "Expiration Date" information but includes the "Forming Code" information, the control unit 316 inquires of the management system 104 to transmit the "Expiration Date" information with reference to the "Forming Code" information.

In step S2305, the control unit 316 extracts the "Forming Code" information from the forming permission information included in the forming data and confirms whether there is a record describing that the forming processing relating to the forming code has been performed and successfully completed. The destination in confirming the presence of the above-mentioned record is, for example, the secondary storage apparatus 206 of the 3D printer 102 or a predetermined storage service in the network system. If the control unit 316 determines that the secondary storage apparatus 206 stores the record describing that the forming processing relating to the forming code has been successfully completed (Yes in step S2305), the operation proceeds to step S2306. If the control unit 316 determines that such a record is not present (No in step S2305), the operation proceeds to step S2310.

In step S2306, the control unit 316 performs forming processing using the forming data. The processing to be performed in step S2306 is similar to the processing performed in step S1604. In step S2307, the control unit 316 determines whether the forming processing has been successfully completed. If the control unit 316 determines that the forming processing has been successfully completed (Yes in S2307), the operation proceeds to step S2308. If the control unit 316 determines that the forming processing has been failed (No in S2307), the operation proceeds to step S2309.

In step S2308, the control unit 316 stores a record of the successfully completed forming processing in the secondary storage apparatus 206 or in the predetermined storage service. The reason why the historical record about the implementation of forming processing is stored in the predetermined storage service is because another 3D printer of the same model can refer to the historical record about the implementation. Further, the control unit 316 records "Forming Success", as "Status" information of the forming data.

In step S2309, the control unit 316 stores a record of the failed forming processing in the secondary storage apparatus 206 or in the predetermined storage service. Further, the control unit 316 records "Forming Failure", as "Status" information of the forming data.

In step S2310, the UI control unit 314 notifies the result that the forming processing cannot be implemented, via the user interface 201 of the 3D printer.

The information to be recorded in steps S2308 and S2309 can be notified to the management system 104 via the network. In this case, the permission information management unit 406 can update the "status" information in the forming permission information illustrated in FIG. 14.

Further, it is feasible to encrypt the forming data again after it has been subjected to the processing illustrated in FIG. 23 and register the encrypted forming data in the management system 104. Through the processing described above, the management system 104 can manage the latest "status" based on the "forming code", with the table illustrated in FIG. 14.

According to the second exemplary embodiment, the forming permission information is embedded into the forming data and the forming control can be realized in such a way as to limit usable printers, even in an environment in which the 3D printer 102 cannot communicate with the management system 104.

Application Example

According to the first exemplary embodiment, acquiring the forming data is feasible by inputting the forming code in the 3D printer. As described in the second exemplary embodiment, the forming permission information illustrated in FIG. 14 can be embedded, as meta information, in the acquired forming data. In such a case, the 3D printer additionally performs decryption processing and status update processing in the processing illustrated in FIG. 16, similar to the second exemplary embodiment.

Unauthorized forming processing can be prevented by implementing the above-mentioned processing even when the forming data acquired by the 3D printer is wiretapped.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-069177, filed Mar. 30, 2016, which is hereby incorporated by reference herein in its entirety.

What is claimed is:

1. A system including a management system that manages forming data to be used in forming of a three-dimensional object and a forming control apparatus,
wherein the management system comprises a memory storing first instructions and at least one processor executing the first instructions causing the management system to:
manage, in a first table, identification information about a forming apparatus that forms the three-dimensional object;
encrypt forming data such that the forming data can be decrypted by the forming control apparatus;
manage, in a second table, identification information about the encrypted forming data and user information for identifying a user who approves utilization of the forming data while associating them with each other;
receive a forming request of forming data;
generate a forming code for forming processing to be performed based on the forming data, in response to an approval by a user identified by the user information managed in association with identification information about the forming data as a target of the forming request in the second table; and
notify a request source of the forming request of the forming code, and
wherein the forming control apparatus comprises a memory storing second instructions and at least one processor executing the second instructions causing the forming control apparatus to:
receive an input of the forming code;
transmit the forming code to the management system;
acquire the encrypted forming data transmitted by the management system according to the forming code;
perform decryption processing on the encrypted forming data acquired from the management system; and
control the forming unit to perform forming processing of a three-dimensional object based on the forming data subjected to the decryption processing.

2. The system according to claim 1, wherein the second instructions further cause the forming control apparatus to notify the management system of a success or failure status of the forming processing performed using the forming data corresponding to the forming code, and wherein the first instructions further cause the management system to manage, in a third table, the forming code, identification information about the forming data corresponding to the forming code, and the status notified from the forming control apparatus.

3. The system according to claim 1,
wherein the first instructions further cause the management system to transmit the encrypted forming data corresponding to the forming code to the forming control apparatus in response to the transmission of the forming code having been input from the forming control apparatus.

4. The system according to claim 3,
wherein the first instructions further cause the management system to manage, a third table, the forming code in association with identification information about a forming apparatus that performs the forming processing on the forming data corresponding to the forming code, and
wherein the encrypted forming data corresponding to the forming code is transmitted to the forming control apparatus if the identification information about the forming apparatus corresponding to a transmission source of the forming code coincides with identification information managed in association with the forming code in the third table.

5. The system according to claim 3,
wherein the first instructions further cause the management system to generate expiration date of the forming code together with the forming code, and
wherein the encrypted forming data corresponding to the forming code is transmitted to the forming control apparatus if the expiration date corresponding to the forming code has not yet passed.

6. The system according to claim 1, wherein the encrypted forming data acquired by the forming control apparatus includes, as meta information, at least one of a forming code, identification information about a forming apparatus that performs the forming processing, and a status.

7. The system according to claim 1, wherein the forming control apparatus is realized as a built-in computer of a forming apparatus that includes the forming unit performing the forming processing based on the forming data subjected to the decryption processing.

8. A method for a system including a management system that manages forming data to be used in forming of a three-dimensional object and a forming control apparatus, the method comprising:
managing, in a first table, by the management system, identification information about a forming apparatus that forms the three-dimensional object;
encrypting, by the management system, forming data such that the forming data is decrypted by the forming control apparatus;
managing, in a second table, by the management system, identification information about the encrypted forming data and user information for identifying a user who approves utilization of the forming data while associating them with each other;
receiving, at the management system, a forming request of forming data;
generating, by the management system, a forming code for forming processing to be performed based on the forming data, in response to an approval by a user identified by the user information managed in association with identification information about the forming data as target of the received forming request in the second table;
notifying, by the management system, a request source of the received forming request of the forming code;
receiving an input of the forming code;
transmitting the forming code to the management system;
acquiring, by the forming control apparatus, encrypted forming data transmitted by the management system according to the forming code;
performing, by the forming control apparatus, decryption processing on the acquired encrypted forming data; and
controlling, by the forming control apparatus, the forming unit to perform forming processing of a three-dimensional object based on the forming data subjected to the decryption processing.

9. The method according to claim 8, further comprising:
notifying the management system of a success or failure status of the forming processing performed using the forming data corresponding to the forming code; and
managing, in a third table, the forming code, identification information about the forming data corresponding to the forming code, and the status notified from the forming control apparatus.

10. The method according to claim 8, further comprising:
transmitting the encrypted forming data corresponding to the forming code to the forming control apparatus in response to the transmission of the forming code having been input from the forming control apparatus.

11. The method according to claim 10, further comprising:
managing, in a third table, the forming code in association with identification information about a forming apparatus that performs the forming processing on the forming data corresponding to the forming code; and
transmitting the encrypted forming data corresponding to the forming code to the forming control apparatus if the identification information about the forming apparatus corresponding to a transmission source of the forming code coincides with the identification information managed in association with the forming code in the third table.

12. The method according to claim 10, further comprising:
generating expiration date of the forming code together with the forming code, and
transmitting the encrypted forming data corresponding to the forming code to the forming control apparatus if the expiration date corresponding to the forming code has not yet passed.

13. The method according to claim 8, wherein the encrypted forming data acquired by the forming control apparatus includes, as meta information, at least one of a forming code, identification information about a forming apparatus that should perform the forming processing, and a status.

14. The method according to claim 8, wherein the forming control apparatus is realized as a built-in computer of a forming apparatus that includes the forming unit performing the forming processing based on the forming data subjected to the decryption processing.

* * * * *